United States Patent
Anandan et al.

(10) Patent No.: US 9,947,932 B2
(45) Date of Patent: Apr. 17, 2018

(54) LITHIUM-AIR BATTERY CATHODES AND METHODS OF MAKING THE SAME

(71) Applicant: Ford Global Technologies, LLC, Dearborn, MI (US)

(72) Inventors: Venkataramani Anandan, Farmington Hills, MI (US); Andrew Robert Drews, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 533 days.

(21) Appl. No.: 13/790,740

(22) Filed: Mar. 8, 2013

(65) Prior Publication Data

US 2014/0255799 A1 Sep. 11, 2014

(51) Int. Cl.
- *H01M 4/86* (2006.01)
- *H01M 4/96* (2006.01)
- *H01M 12/08* (2006.01)
- *H01M 4/88* (2006.01)

(52) U.S. Cl.
CPC ......... *H01M 4/8626* (2013.01); *H01M 4/861* (2013.01); *H01M 4/8807* (2013.01); *H01M 4/8828* (2013.01); *H01M 4/8875* (2013.01); *H01M 4/8878* (2013.01); *H01M 4/96* (2013.01); *H01M 12/08* (2013.01); *Y02E 60/128* (2013.01)

(58) Field of Classification Search
CPC .................................................. H01M 12/08
See application file for complete search history.

(56) References Cited

U.S. PATENT DOCUMENTS

| | | | | |
|---|---|---|---|---|
| 2004/0038090 | A1* | 2/2004 | Faris | 429/12 |
| 2006/0247122 | A1 | 11/2006 | Hampden-Smith et al. | |
| 2007/0243454 | A1* | 10/2007 | Klaassen | 429/52 |
| 2009/0311596 | A1* | 12/2009 | Visco | H01M 2/1673 429/188 |
| 2012/0202033 | A1* | 8/2012 | Chang | H01G 11/24 428/219 |

(Continued)

FOREIGN PATENT DOCUMENTS

WO   WO 2011/011082   *  1/2011   ............ H01M 12/06

OTHER PUBLICATIONS

Oudenhoven, J.F. et al., "All-Solid-State Lithium-Ion Microbatteries: A Review of Various Three-Dimensional Concepts," Adv. Energy Mater. 2011, 1, pp. 10-33.

(Continued)

*Primary Examiner* — Jonathan Crepeau
*Assistant Examiner* — Jacob Buchanan
(74) *Attorney, Agent, or Firm* — James Dottavio; Brooks Kushman P.C.

(57) ABSTRACT

A lithium-air battery cathode having increased mesopore and macropore volume and methods of making the cathode are provided. In at least one embodiment, a plurality of mesopores is present in the cathode having a porosity of 1 to 70 percent. In another embodiment, a plurality of macropores are present in the cathode having a porosity of 5 to 99 percent. In one embodiment, the mesopores and macropores are imprinted using a sacrificial material. In another embodiment, the mesopores and macropores are imprinted by applying a template. In another embodiment, the mesopores and macropores are formed by coating cathode material onto a porous substrate.

7 Claims, 5 Drawing Sheets

(56) References Cited

U.S. PATENT DOCUMENTS

2013/0295471 A1* 11/2013 Visco et al. .................. 429/405

OTHER PUBLICATIONS

Xiao, J. et al., "Optimization of Air Electrode for Li/Air Batteries," J. of the Electrochemical Soc., 157 (4), (2010), pp. A487-A492.
Girishkumar, G. et al., "Lithium-Air Battery: Promise and Challenges," J. of Phys. Chem. Lett. 2010, 1, pp. 2193-2203.
Tran, C. et al., "Investigation of the Gas-Diffusion-Electrode Used as Lithium/Air Cathode in Non-Aqueous Electrolyte and the Importance of Carbon Material Porosity," Journal of Power Sources 195 (2010), pp. 2057-2063.
Kuboki, T. et al., "Lithium-Air Batteries Using Hydrophobic Room Temperature Ionic Liquid Electrolyte," Journal of Power Sources 146 (2005), pp. 766-769.
Beattie, S.D. et al., "High-Capacity Lithium-Air Cathodes," J. Electrochem. Soc. 2009, v. 156, issue 1, pp. A44-A47.
Kraytsberg, A. et al., "Review on Li-air Batteries—Opportunities, Limitations and Perspective," Journal of Power Sources 196 (2011), pp. 886-893.
Copper Foam Product Data Sheet, EFOAM S.A., 1 pg.
Johnson, R.C., "Battery 500 Project Charged Up Over All-Electric Cars," http://www.smartertechnology.com—Smarter Technology, contributed 2009.
Martin, J.J. et al., "Air Cathodes for Metal-Air Batteries and Fuel Cells," 2009 IEEE Electrical Power & Energy Conference (2009), 6 pgs.

* cited by examiner

LITHIUM-AIR BATTERY CATHODES AND METHODS OF MAKING THE SAME

TECHNICAL FIELD

One or more embodiments relate to a cathode structure for lithium-air batteries and methods of making the same.

BACKGROUND

Rechargeable lithium-air (Li-air) batteries are a potential future energy source for electric vehicles due to their high theoretical energy density, which is the highest of any metal-air batteries at about 11,300 Wh/kg. However, Li-air batteries are not commercially viable due to several factors, such as low demonstrated capacity, poor rate capability, low energy efficiency, and poor cycle life. The capacity and rate capability of Li-air batteries have been found to be influenced by the electrode structure.

The term "electric vehicle" as used herein, includes vehicles having an electric motor for vehicle propulsion, such as battery electric vehicles (BEV), hybrid electric vehicles (HEV), and plug-in hybrid electric vehicles (PHEV).

SUMMARY

In at least one embodiment, a Li-air battery cathode is provided. The cathode comprises a bulk material, a plurality of mesopores present in the bulk material and having a porosity of 1 to 70 percent, and a plurality of macropores present in the bulk material and having a porosity of 5 to 99 percent.

In another embodiment, the plurality of mesopores have a porosity of 5 to 50 percent and the plurality of macropores have a porosity of 20 to 90 percent.

In another embodiment, the plurality of mesopores is a plurality of imprinted mesopores. In another embodiment, the plurality of macropores is a plurality of imprinted macropores.

In another embodiment, each of the plurality of mesopores has a diameter in the range of 2 to 50 nm and each of the plurality of macropores has a diameter of over 50 nm.

In another embodiment, the cathode is in the form of a sheet having a first surface and an opposing second surface and the cathode includes a pore size gradient along the thickness of the cathode from the first surface to the second surface.

In another embodiment, the first surface is an air-side surface and the second surface is an anode-side surface and the pore size gradient generally decreases in a direction from the air-side surface to the anode-side surface.

In another embodiment, at least some of the plurality of imprinted macropores is between a plurality of imprinted micropillars.

In another embodiment, the plurality of imprinted micropillars has a height from 1 µm to 500 µm. In another embodiment, the plurality of imprinted micropillars has a width from 20 nm to 200 µm.

In another embodiment, the cathode further comprises a porous substrate supporting the bulk material. In another embodiment, the porous substrate has a surface contour and the bulk material is a carbon coating having a surface contour that follows the surface contour of the porous substrate.

In another embodiment, the porous substrate is an open cell metal foam. In another embodiment, the porous substrate has pores with diameters from 20 nm to 200 µm.

In at least one embodiment, a method of forming a Li-air battery cathode according to any of the above embodiments is provided. The method comprises forming a slurry including a carbon material, a binder, and a sacrificial particle material; casting the slurry to form a cathode film; and applying a solvent to the dried film to selectively remove the sacrificial particle material to create a plurality of pores in the cathode where the particle material was located before the applying step.

In another embodiment, the sacrificial particle material is polystyrene and the solvent is a polar solvent.

In at least one embodiment, a method of forming a Li-air battery cathode according to any of the above embodiments is provided. The method comprises forming a wet slurry including a carbon material and a binder; and applying a template to the wet slurry to form a plurality of micropillars in the wet slurry, to form a plurality of micropillars on the cathode once the wet slurry dries.

In another embodiment, the template is removed before the wet slurry dries. In another embodiment, the template is removed after the wet slurry dries.

In at least one embodiment, a method of forming a Li-air battery cathode according to any of the above embodiments is provided. The method comprises forming the cathode by coating a carbon material onto a porous substrate having a surface contour to form a carbon coating having a surface contour that follows the surface contour of the porous substrate.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. As used herein, unless otherwise stated, a "micropore" may be a pore that has a diameter of less than two nanometers (2 nm), a "mesopore" may be a pore that has a diameter of two to fifty nanometers (2-50 nm), and a "macropore" may be a pore that has a diameter of more than fifty nanometers (50 nm).

Figure 1:
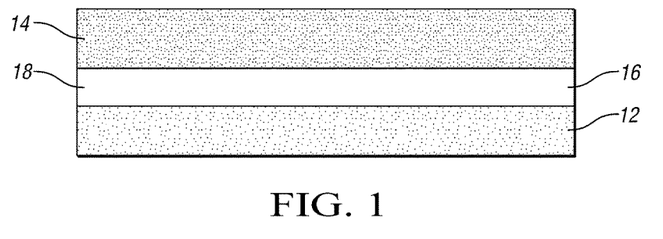
FIG. 1 is a schematic cross section of a Li-air battery according to one embodiment.

With reference to FIG. 1, a lithium-air (Li-air) battery 10 typically includes an anode 12, a cathode 14, an electrolyte 16, and a separator 18 (depending on the battery design), with the electrolyte 16 disposed within the separator 18, anode 12 and cathode 14. During discharge, lithium is oxidized at the anode 12 to form lithium ions and electrons. The electrons flow through an external circuit (not shown) and the lithium ions travel through the electrolyte 16, and possibly through a separator 18, to the cathode 14. The cathode 14 is generally porous and open to a source of oxygen, typically atmospheric air, and the lithium ions react with the oxygen to form lithium oxide ($Li_2O$) and/or lithium peroxide ($U_2O_2$). During charging, lithium metal is plated back on the anode 12 and oxygen gas is released at the cathode 14. The operation and electrochemical process of Li-air batteries is known in the art and will not be discussed in further detail. Li-air batteries may be electrically connected in series or parallel to form a battery pack for an automotive vehicle. Power from such a battery pack may be used to generate motive power, via an electric machine, to move the vehicle.

The cathode material and structure has been found to affect the capacity and rate capability of Li-air batteries. Typical cathodes are made of a porous carbon material, having various pore size distributions. It has been found that pore size and pore volume significantly affect the capacity of Li-air batteries. To increase capacity and rate capability of a Li-air battery, a cathode 14 is provided having increased mesopore and macropore volume.

In at least one embodiment, the cathode 14 has a plurality of mesopores and a porosity of the mesopores is from 1 to 70 percent. In another embodiment, the porosity of the mesopores is from 5 to 50 percent. In another embodiment, the porosity of the mesopores is from 5 to 30 percent. In another embodiment, the porosity of the mesopores is from 10 to 25 percent. In at least one embodiment, the cathode 14 has a plurality of macropores and a porosity of the macropores is from 5 to 99 percent. In another embodiment, the porosity of the macropores is from 20 to 90 percent. In another embodiment, the porosity of the macropores is from 30 to 90 percent. In another embodiment, the porosity of the macropores is from 40 to 85 percent. In another embodiment, the porosity of the macropores is from 50 to 80 percent. As used herein, the porosity of the mesopores refers to the porosity of the cathode (e.g. pore volume divided by total volume) which is comprised of mesopores. Similarly, the porosity of the macropores is the porosity of the cathode which is comprised of macropores. By definition, the total porosity (e.g. porosity of mesopores plus porosity of macropores) must be less than 100 percent. The above ranges are examples, and other porosities may be present without exceeding the scope of the invention. The mesopore and macropore porosities may vary depending on the battery cell design parameters, for example: discharge capacity, discharge rate, and/or volumetric energy density.

Figure 2:
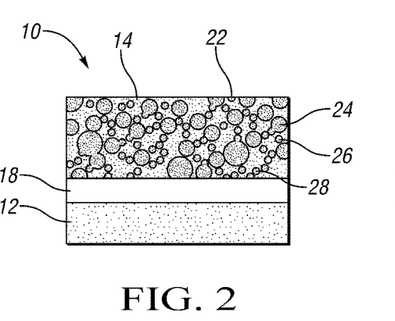
FIG. 2 is a schematic cross section of a Li-air battery cathode having a sacrificial material embedded therein, according to one embodiment.
Figure 3:
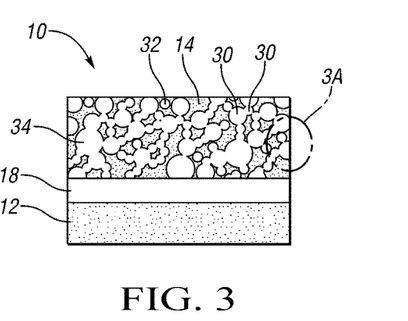
FIG. 3 is schematic a cross section of the Li-air battery cathode of FIG. 2 following removal of the sacrificial material.
Figure 3A:
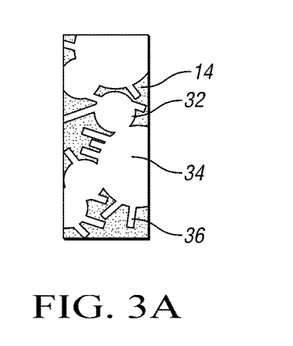
FIG. 3A is close-up view of the circled portion of FIG. 3.
Figure 4:
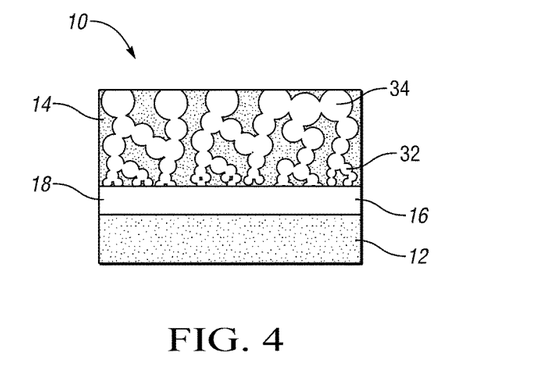
FIG. 4 is a schematic cross section of a Li-air battery following removal of a sacrificial material according to an embodiment.

With reference to FIGS. 2-4, a cathode 14 having increased mesopore and macropore volume and/or porosity may be formed using a sacrificial material 22. In at least one embodiment, the cathode 14 comprises a source of carbon and a binder. In one embodiment, the carbon is Vulcan carbon and the binder is polytetrafluoroethylene (PTFE), also known as the brand name Teflon. The sacrificial material 22 may be any material that can be selectively removed from the cathode 14 while leaving the cathode material substantially unaltered. In one embodiment, the sacrificial material 22 may be removed by dissolution in a suitable solvent. In another embodiment, the sacrificial material may be removed by applying heat to cause a phase change in the sacrificial material 22, but not the cathode material.

In at least one embodiment, the sacrificial material 22 is polystyrene that is removed by dissolution. In embodiments where the sacrificial material 22 is polystyrene, the solvent may be any suitable solvent that will dissolve the polystyrene without altering the carbon and PTFE cathode 14. In one embodiment, the solvent used is methylene chloride. Other polar solvents such as acetone can also be used to dissolve polystyrene. Various polymer or other organic agents such as poly(ethylene glycol), poly(methyl methacrylate), gelatin, sucrose can also be used as sacrificial materials for creating pores. The solvent may be any suitable substance that will dissolve the sacrificial material without altering the carbon and binder in the cathode.

In at least one embodiment, the sacrificial material 22 is in the form of particles or micro beads 24. The particles 24 may have any suitable shape, such as spherical or substantially spherical. However, it is to be understood that any three dimensional shape of sacrificial material 22 is possible and contemplated within the definition of particle, such as a cube, rectangular prism, triangular prism, or others. The particles 24 are distributed throughout the cathode material. The particles 24 may be formed with a variety of diameters or may all have substantially the same diameter. In at least one embodiment, two different groups 26, 28 of particle sizes may be distributed within the cathode 14. In one embodiment, one group 26 of particles 24 has a diameter of a mesopore and the other group 28 of particles 24 has a diameter of a macropore (i.e. from 2-50 nm and larger than 50 nm, respectively). Within each group 26, 28 there may be a further distribution of particle sizes.

In at least one embodiment, shown in FIG. 4, the cathode 14 has a gradient pore size distribution through its structure. For example, smaller pores or mesopores are created near the separator 18 or anode 12 side of the cathode and larger or macropores at the air side of the cathode. Such a distribution can avoid the rapid blockage of pores on the air side due to discharge product, thereby increasing the discharge capacity. Pores at the separator side of the cathode may have pores from 2 nm to 50 nm and pores at air side may have pores from more than 50 nm. This type of structure may be formed by sequentially casting a cathode 14 layer containing larger particles 24 followed by a cathode 14 layer containing smaller particles 24. In certain cases, multiple castings can be performed based on the gradient of pore distribution required. In some embodiments, the layers can be casted separately and then laminated together. In other embodiments, the distribution of particles in the cast can be created under an external influence such as electric field, magnetic field, temperature gradient, or others. Various techniques such as colloidal self-assembly, phase inversion, electrophoresis, and freeze-drying can also be used to create a gradient of pore sizes in the cathode 14. For example, pores can be formed in the electrode film by freezing the solvent immediately after casting the slurry and then removing the frozen solvent by sublimation. During this process, pores are formed from the voids left by solvent removed. Porous structures can be controlled using process conditions such as freeze temperature, freezing direction, and method of freezing.

In at least one embodiment, the particles 24 in the first group 26 have a diameter from 2 to 50 nm. In another embodiment, the particles 24 in the first group 26 have a diameter from 20 to 50 nm. In at least one embodiment, the particles 24 in the second group 28 have a diameter of at least 50 nm. In another embodiment, the particles 24 in the second group 28 have a diameter of 50 nm to 1000 nm. In another embodiment, the particles 24 in the second group 28 have a diameter of 50 to 200 nm. For example, in one embodiment there may be a first group 26 of particles 24 having a diameter of 25 nm and a second group 28 of particles 24 having a diameter of 500 nm. In another embodiment, the first group 26 may have particles with diameters of 20 nm and 40 nm and the second group 28 may have particles 24 having a diameter of 100 nm and 200 nm.

As illustrated in FIGS. 2-4, when a cathode 14 having particles 24 of sacrificial material 22 is exposed to conditions that cause the particles 24 to be removed from the cathode 14, pores 30 are created in the cathode 14 that have a size/diameter corresponding to the size of the eliminated particles 24. If more than one particle size was present, then a distribution of pore sizes is created in the cathode 14 corresponding to the distribution of particle sizes originally present. In the embodiment shown in FIG. 2, two groups of particle sizes 26, 28 are present, with a first group 26 having a mesopore-size diameter and a second group 28 having a macropore-size diameter. Upon elimination of the particles 24, the cathode 14 is left with a group of mesopores 32 and a group of macropores 34 corresponding to the eliminated particles 24. As illustrated in the enlarged FIG. 3A, micropores 36 are also present within the cathode 14, which are formed during the production of the cathode material. Accordingly, following the elimination of the particles 24, the cathode 14 is left with micropores 36, mesopores 32, and macropores 34 in this embodiment.

In at least one embodiment, the cathode 14 having a distribution of particles 24 is synthesized by first adding an emulsion of a binder and an emulsion of the particles 24 of sacrificial material 22 to an aqueous mixture. A carbon source is then added to the mixture, which is then agitated, dried, and pressed into a sheet. The particles are then eliminated by applying a suitable solvent, and the sheet is then dried.

Figure 5:
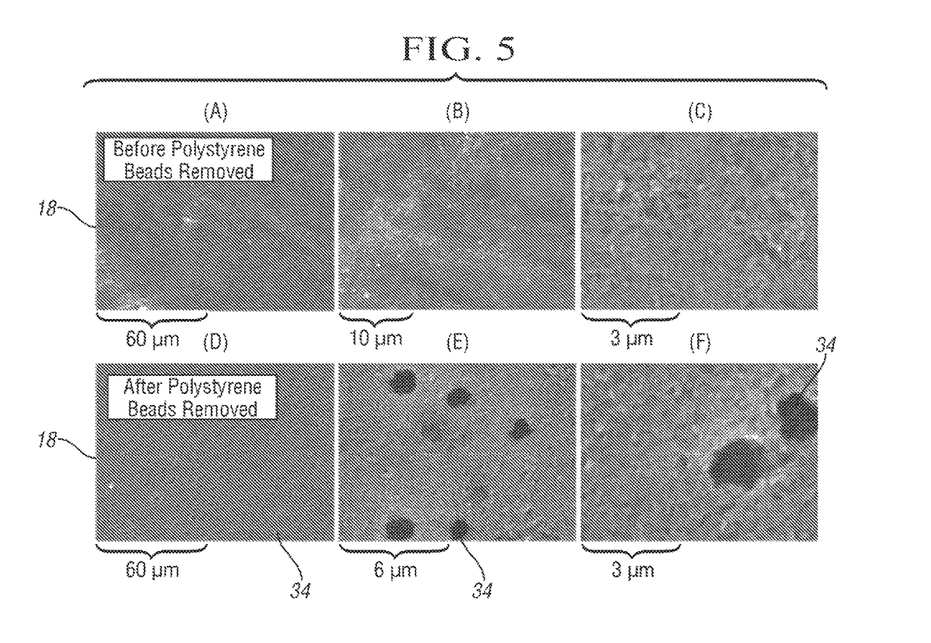
FIGS. 5A-5F are micrographs of an embodiment of a Li-air cathode before (A-C) and after (D-F) a sacrificial material is removed.

In one example, shown in FIGS. 5A-5F, an emulsion of PTFE and an emulsion of polystyrene particles (~2 µm) were added to a stirred mixture of water and methanol. Vulcan carbon was then added and the mixture was sonicated for about one hour and then dried overnight under vacuum. The dried mixture was pressed into a sheet by a high-pressure press. The polystyrene particles were eliminated by immersing the sheet in methylene chloride for about one hour and then the sheet was dried again under vacuum. FIGS. 5A-5C show the cathode 14 at various magnifications prior to immersion in the methylene chloride, with the particles 24 still present. FIGS. 5D-5F show the cathode 14 at similar magnifications following immersion, with macropores clearly visible in the surface.

Figure 6:
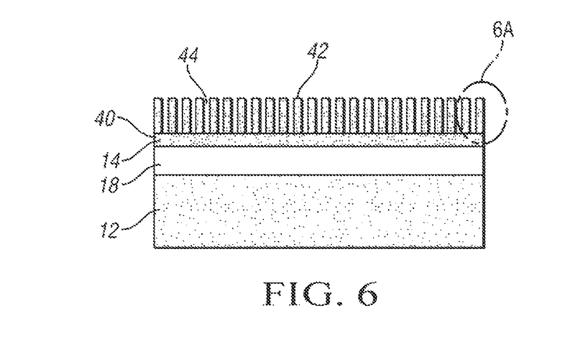
FIG. 6 is schematic cross section of a Li-air cathode having micropillars according to one embodiment.
Figure 6A:
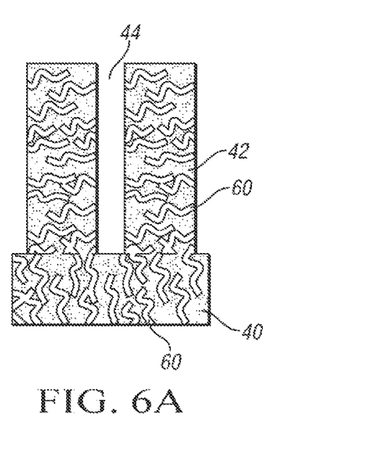
FIG. 6A is close-up view of the circled portion of FIG. 6.
Figure 7:
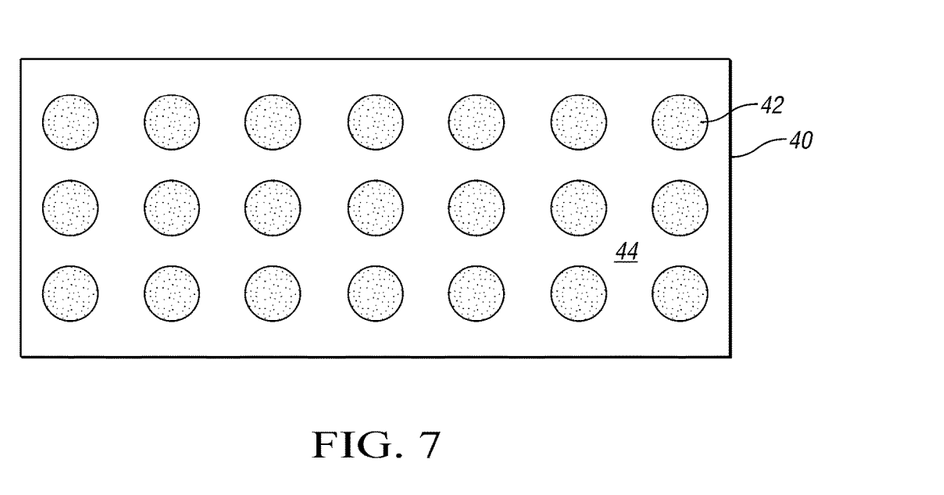
FIG. 7 is a schematic top view of a Li-air cathode having cylindrical micropillars according to one embodiment.
Figure 8:
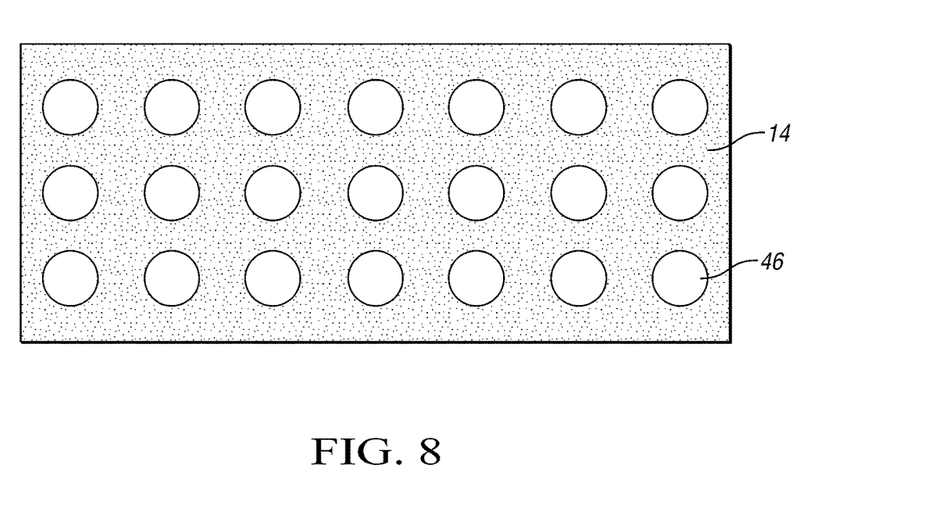
FIG. 8 is a schematic top view of a Li-air cathode having cylindrical micropillar pores according to one embodiment.

With reference to FIGS. 6-8, a cathode 14 having increased mesopore and/or macropore volume and/or porosity may be formed having a columnar or micropillar configuration. The cathode 14 has a base 40 which faces the anode 12. In at least one embodiment, the cathode 14 comprises a source of carbon and a binder, which may be combined with a liquid to form slurry. In one embodiment, the carbon is C45 carbon and the binder is polyvinylidene difluoride (PVDF), and they are mixed in an acetone solution to form slurry.

In an embodiment shown in FIGS. 6 and 7, the cathode 14 and the micropillars 42 are formed by casting the carbon and binder slurry into a mold configured to form an array of micropillars 42 extending from a base 40 forming the separator 18 side of the cathode 14 towards the air side of the cathode 14. In this embodiment, pores 44 are formed between the micropillars 42. The height, diameter, and spacing of the micropillars 42 can be adjusted to increase or decrease the volume of pores 44 between the micropillars 42. The micropillars 42 may have any suitable cross-sectional shape, for example circular or square. The micropillars 42 may also have any suitable overall shape, such as cylindrical, rectangular, conical, or others.

In the embodiment shown in FIG. 8, the cathode 14 is formed by casting the carbon and binder slurry into a mold having an array of micropillars to form an array of columnar pores 46 within the cathode 14 when removed from the mold. The pores 46 may have any suitable cross-sectional shape, for example circular or square. The pores 46 may also have any suitable overall shape, such as cylindrical, rectangular, conical, or others.

Figure 9:
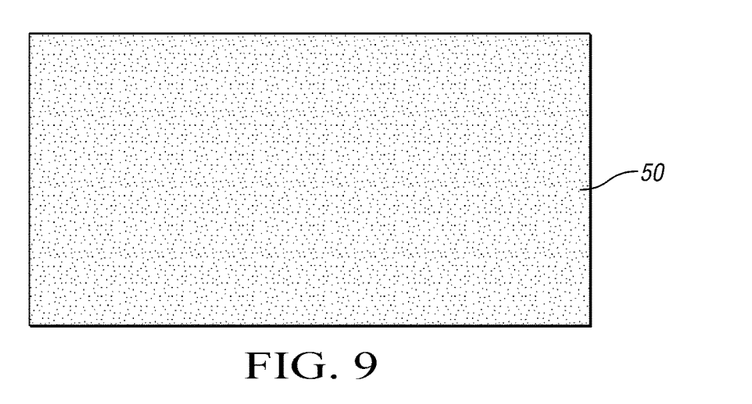
FIG. 9 is a schematic top view of a Li-air cathode prior to impression by a mold according to one embodiment.
Figure 10:
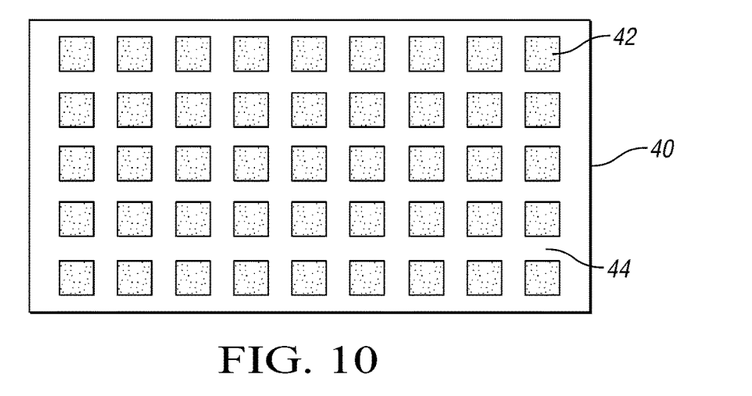
FIG. 10 is a schematic top view of a Li-air cathode having square micropillars following a mold impression according to one embodiment.
Figure 11:
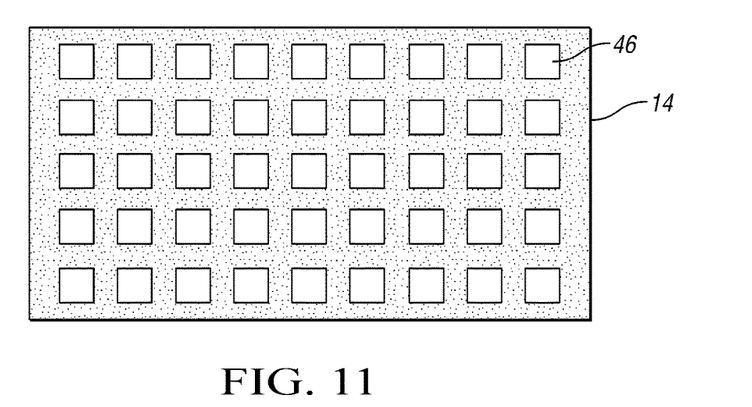
FIG. 11 is a schematic top view of a Li-air cathode having square micropillar pores following a mold impression according to one embodiment.

Instead of forming the micropillars 42 or pores 46 by casting, they may be formed using an impression. In at least one embodiment, a mold may be pressed into a soft cathode 14 sheet to form either micropillars 42 with pores 44 formed in between or columnar pores 46 in the cathode 14, as described above. The impression may be done, for example, before the cathode has been completely dried. As illustrated in FIG. 9, a sheet 50 of cathode 14 may be provided and a mold may be applied to form micropillars 42 or columnar pores 46. In the embodiment shown in FIG. 10, the mold forms square micropillars 42 with pores 44 formed there between. As described above, the mold could alternately be configured to form columnar pores 46 in the sheet 50 of cathode 14, as shown in FIG. 11. As describe above regarding the cast cathodes 14, the height, diameter, and spacing of the micropillars 42 or columnar pores 46 can be adjusted to increase or decrease the volume of pores. The micropillars 42 or columnar pores 46 may have any suitable cross-sectional shape, for example circular or square. The micropillars 42 or columnar pores 46 may also have any suitable overall shape, such as cylindrical, rectangular, or others.

The process of forming micropillars 42 and columnar pores 46 is not limited to casting and using impressions. Any suitable method of forming micropillars 42 and columnar pores 46 may be used, for example various forms of lithography and use of rough surfaces. Columnar pores can also be formed by ablating materials from the electrode using a laser.

In one embodiment, the micropillars 42 have a height from 1 µm to 500 µm. In another embodiment, the micropillars 42 have a height from 10 µm to 300 µm. In another embodiment, the micropillars 42 have a height from 10 µm to 200 µm. In one embodiment, the micropillars 42 have a diameter/width from 1 nm to 500 µm. In another embodiment, the micropillars 42 have a diameter/width from 20 nm to 200 µm. In another embodiment, the micropillars 42 have a diameter/width from 20 nm to 2 µm. In one embodiment, the micropillars 42 having a spacing therebetween of 1 nm to 500 µm. In another embodiment, the micropillars 42 having a spacing therebetween of 20 nm to 200 µm. In another embodiment, the micropillars 42 having a spacing therebetween of 20 nm to 2 µm.

In one embodiment, the columnar pores 46 have a height from 1 µm to 500 µm. In another embodiment, the columnar pores 46 have a height from 10 µm to 300 µm. In another embodiment, the columnar pores 46 have a height from 10 µm to 200 µm. In one embodiment, the columnar pores 46 have a diameter/width from 1 nm to 500 µm. In another embodiment, the columnar pores 46 have a diameter/width from 20 nm to 200 µm. In another embodiment, the columnar pores 46 have a diameter/width from 20 nm to 2 µm. In one embodiment, the columnar pores 46 having a spacing therebetween of 1 nm to 500 µm. In another embodiment, the columnar pores 46 having a spacing therebetween of 20 nm to 200 µm. In another embodiment, the columnar pores 46 having a spacing therebetween of 20 nm to 2 µm.

Figure 12:
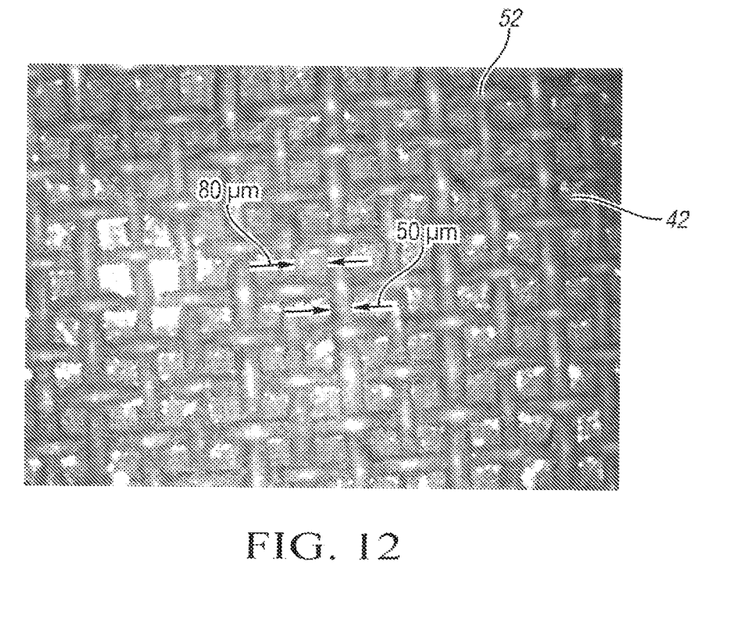
FIG. 12 is a micrograph top view of a Li-air cathode formed by casting the cathode material onto a mesh according to one embodiment.

As illustrated in the enlarged portion of FIG. 6, the base 50 of the cathode 14 and the micropillars 42 have pores 60 therein. The pores 60 may be created by incorporating a sacrificial material 22 during the slurry step and removing it selectively from the cathode 14, as described above. An example of the cathode 14 casting process is shown in FIG. 12. A slurry mixture comprising C45 carbon and a PVDF binder was mixed in acetone and then casted onto a wire mesh 52 with square openings of 80 µm and a wire width of 50 µm. The cathode 14 was then dried in an open atmosphere and then removed from the wire mesh 52. FIG. 12 shows the morphology of cathode 14 after the mesh 52 was removed. The resulting cathode 14 had an array of square features having a width of 80 µm and 50 µm spacing between them.

Figure 13:
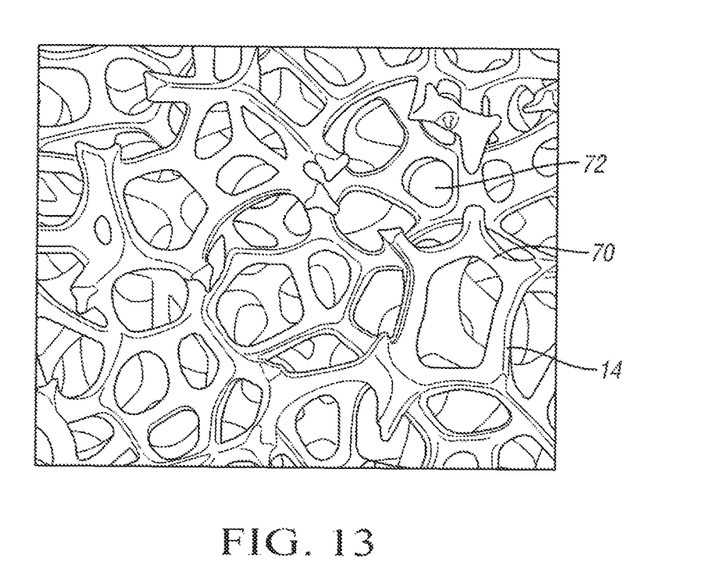
FIG. 13 is a schematic perspective view of a Li-air cathode formed by coating a porous template with cathode material according to one embodiment.

With reference to FIG. 13, a cathode 14 having increased mesopore and/or macropore volume and/or porosity may be formed by coating the cathode material onto a porous substrate or template 70. In at least one embodiment, similar to embodiments described above, the cathode material may comprise a carbon source and a binder. In one embodiment, slurry may be formed including the carbon and binder and the template 70 may be dip-coated in the slurry and subsequently dried to form a coating of cathode material on the template 70. In at least one embodiment, carbon may be coated on the template 70 using a dry process, for example chemical vapor deposition (CVD). In one embodiment, a carbon coating may be deposited on the template 70 by thermal pyrolysis of a hydrocarbon vapor. In one example, the carbon coating can be formed by thermal pyrolysis of methane ($CH_4$).

The template 70 is typically not removed from the cathode 14, but is part of the final structure to provide mechanical support and increased electrical conductivity. However, embodiments wherein the template 70 is at least partially removed are also contemplated. The porous template 70 allows the cathode material to be dispersed, providing a high surface area, open oxygen gas access, and efficient electrical conduction. In at least one embodiment, the cathode material is uniformly coated on the internal surfaces of the template 70 in order to maximally utilize the high surface area provided by the template 70.

In at least one embodiment, the template 70 is an open cell foam or a reticulated foam. However, other porous structures are also contemplated, such as sponge structures, dendritic structures, connected particle structures, and others. In at least one embodiment, the template 70 comprises a metallic material. Any suitable metal may be used, for example copper, aluminum, and nickel. In addition to metallic materials, the template 70 may comprise a conductive polymer, for example polyaniline, polypyrrole, derivatives of polythiophene and poly(phenylene vinylene), polyacetylenes, and others. The template 70 may also comprise an inorganic material that is in electrolytic contact with a source of metal ions, for example solid electrolytes such as LLZO, LTAP, PEO, Lipon can be used. However, the template 70 need not be comprised of an electrically conductive material; the conductivity may be provided through the cathode material itself. An example of a suitable template 70 for use in a cathode 14 having increased mesopore and/or macropore volume is an open cell copper foam, which is commercially available from manufacturer EFoam. The copper foam has porosity in pores per inch (ppi) of 45 to 100.

In at least one embodiment, the template 70 has pores 72 having diameters of 20 nm to 200 µm. In another embodiment, the template 70 has pores 72 having diameters of 20 nm to 2 µm. In another embodiment, the template 70 has pores 72 having diameters of 20 nm to 300 nm. In at least one embodiment, the cathode material is coated to the template 70 but does not fill in the pores 72. In one embodiment, the cathode 14 has a shape substantially the same as the template 70, but with a layer of cathode material thereon. However, it is possible that in other embodiments the cathode material at least partially fills some pores 72.

While the best mode has been described in detail, those familiar with the art will recognize various alternative designs and embodiments within the scope of the following claims. Additionally, the features of various implementing embodiments may be combined to form further embodiments of the invention. While various embodiments may have been described as providing advantages or being preferred over other embodiments or prior art implementations with respect to one or more desired characteristics, those of ordinary skill in the art will recognize that one or more features or characteristics may be compromised to achieve desired system attributes, which depend on the specific application and implementation. These attributes may include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications. Additionally, the features of various implementing embodiments may be combined to form further embodiments of the invention.

What is claimed is:

1. A Li-air battery comprising:
   an anode, cathode, and a separator therebetween;
   the cathode being formed of a carbon material and binder mixture and including a base adjacent the anode and an array of micropillars extending from the base away from the anode, the micropillars having a height of 10 to 300 µm, a width of 20 nm to 2 µm, and a spacing therebetween of 20 nm to 200 µm; and
   the base and the array of micropillars having a plurality of pores defined therein.

2. The Li-air battery of claim 1, wherein the carbon material and binder mixture is a cathode bulk material.

3. The Li-air battery of claim 2, wherein the cathode bulk material includes mesopores and macropores.

4. A Li-air battery comprising:
   an anode;
   a cathode being formed of a carbon material and binder mixture, and including a base adjacent the anode and a micropillar array extending from the base away from the anode and having a height of 10 to 300 μm, a width of 20 nm to 2 μm, and a spacing therebetween of 20 nm to 200 μm, the base and micropillar array having pores therein; and
   a separator therebetween.

5. The Li-air battery of claim 4, wherein the carbon material and binder mixture is a cathode bulk material.

6. The Li-air battery of claim 4, wherein the cathode bulk material includes mesopores and macropores.

7. A Li-air battery comprising:
   an anode;
   a cathode being formed of a carbon material and binder mixture, and including a base adjacent the anode and a micropillar array extending from the base away from the anode and having a height of 10 to 300 μm, a width of 20 nm to 2 μm, and a spacing therebetween of 20 nm to 200 μm, the base and micropillar array having pores therein, the cathode having an array of square features; and
   a separator therebetween.

* * * * *